(12) United States Patent
Sabin et al.

(10) Patent No.: US 8,443,416 B2
(45) Date of Patent: May 14, 2013

(54) TECHNIQUES FOR SECURE CHANNEL MESSAGING

(75) Inventors: Jason Allen Sabin, Lehi, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 130 days.

(21) Appl. No.: 13/102,303

(22) Filed: May 6, 2011

(65) Prior Publication Data

US 2012/0284768 A1    Nov. 8, 2012

(51) Int. Cl.
*H04L 9/00* (2006.01)

(52) U.S. Cl.
USPC .............................. 726/1; 713/150; 713/168

(58) Field of Classification Search .................. 726/1–7, 726/13; 713/150–153, 168–170, 181, 189
See application file for complete search history.

(56) References Cited

U.S. PATENT DOCUMENTS

| | | | |
|---|---|---|---|
| 6,381,644 B2 * | 4/2002 | Munguia et al. | 709/225 |
| 7,200,676 B2 | 4/2007 | Christensen et al. | |
| 7,590,138 B2 | 9/2009 | Benard et al. | |
| 7,606,361 B2 | 10/2009 | Vedula | |
| 7,895,649 B1 * | 2/2011 | Brook et al. | 726/22 |
| 7,937,504 B2 | 5/2011 | Flanagan et al. | |
| 8,214,707 B2 * | 7/2012 | Munson et al. | 714/748 |

* cited by examiner

*Primary Examiner* — Hosuk Song
(74) *Attorney, Agent, or Firm* — Schwegman, Lundberg & Woessner, P.A.

(57) ABSTRACT

Techniques for secure channel messaging are provided. Resources communicate with one another over temporary and secure communication channels. The channels come in and out of existence or switch between different channels using a variety of information and based on dynamic policy evaluation. In some situations, the channels are randomly generated using a variety of the information. Authorized resources are informed of the channels to use and when to use them for purposes of delivering and receiving messages to communicate.

15 Claims, 6 Drawing Sheets

TECHNIQUES FOR SECURE CHANNEL MESSAGING

BACKGROUND

Many advances have occurred in the last decade in information technology. Today, cell phones, everyday appliances, transportation devices, clothing, jewelry, etc. have network, storage, and processing capabilities. A decade or so ago, it was only computers that could perform such feats. Recently, the appliances themselves are becoming irrelevant as the processing to perform functions and the storage used by the processing has moved to cloud-based computing.

Still with the future of global cloud computing there needs to be a mechanism to securely share messages that companies, employees and others can subscribe to. There needs to be the ability to share across the enterprise boundary and between companies. The ability to share messages to all necessary parties needs to be performed in a fashion where security is inherit within all aspects and is always being maintained. Unfortunately, such technology does not exist in the industry.

Consider the following situation to illustrate the deficiency in the industry with respect to secure messaging, when one company (X) hires a contract employee (ACME) to work on-site at X. The contract employee is working on-site to X and is using X resources to accomplish his/her assignment. X creates a virtual machine (VM) from their private cloud for the contractor. The contract employee is monitored for all activities on the VM. This includes Uniform Resource Locator (URL) links accessed; what is installed on the VM; and everything that occurs with this VM. All of the events that are related to this need to be shared with both X and ACME. X wants to make sure the contract employee is doing everything he/she should be, but ACME also wants to check all of this information. Additionally if X does not provide software licenses for the contract employee, then ACME needs to provide this. There needs to be some mechanism to share events and messages not only with X but also with ACME.

Another example problem to consider is that X hires Digital (Software as a Service (SaaS)) to provide some cloud service applications. Digital SaaS needs to monitor the servers and applications running the SaaS application. All events from these services are collected. Digital SaaS has a Service Level Agreement (SLA) with X. X wants to also monitor and be notified of all events and important messages from this same set of services provided by Digital SaaS. There needs to be a secure mechanism to share all events from Digital SaaS to X.

Unfortunately, with the present technology of the industry the above-presented situations are not efficiently capable of being handled.

SUMMARY

Various embodiments of the invention provide techniques for channel messaging. Specifically, and in one embodiment a method for secure channel messaging is presented.

An authenticated principal, who has successfully logged into a system, is identified. A channel policy is then obtained in response to a principal identity for the authenticated principal. The channel policy defines a secure communication channel for use during a communication session that the principal has with the system. An event manager is configured on a device of the principal with the channel policy. The channel policy is dynamically evaluated by the event manager to monitor activities of the principal during the communication session, and the event monitor dynamically pushes messages to the secure communication channel defined by the channel policy. The messages are produced based on events generated by the activities of the principal.

DETAILED DESCRIPTION

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell, Inc.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-6.

Figure 1:
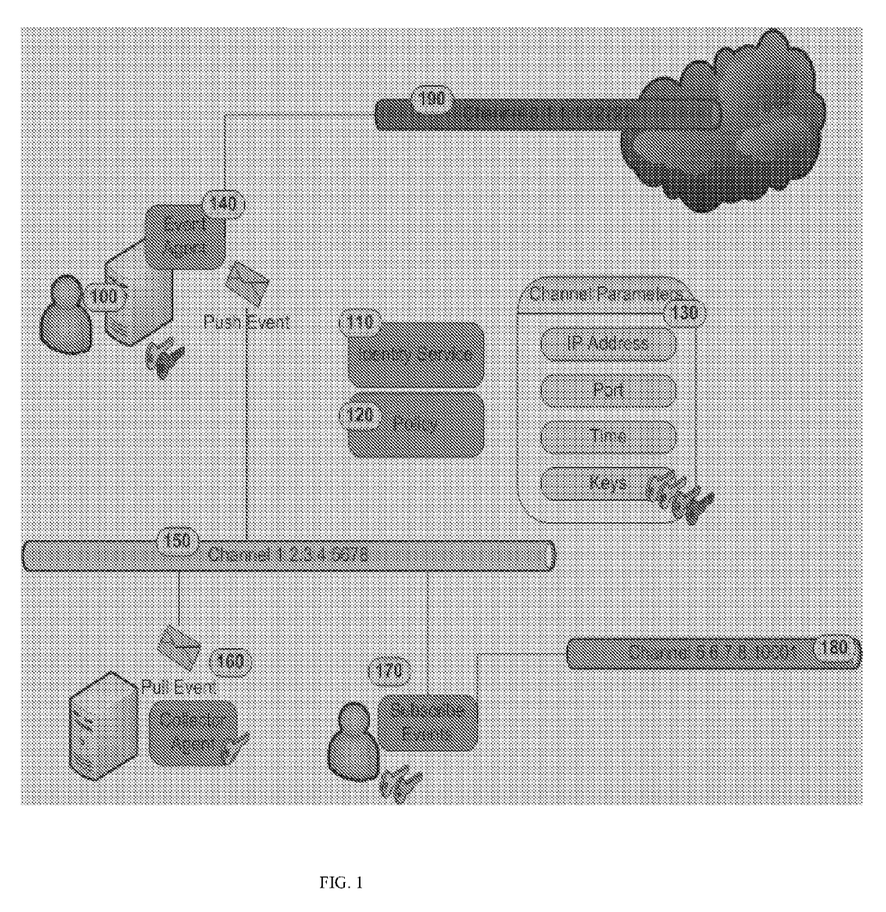
FIG. 1 is a diagram depicting a technique for secure channel messaging within a context of a specific example within an enterprise, according to the techniques presented herein.

FIG. 1 is a diagram depicting a technique for secure channel messaging within a context of a specific example within an enterprise, according to the techniques presented herein. It is noted that the FIG. 1 is presented for purposes of illustration and comprehension. It is to be understood that other arrangements and/or components can be used to achieve the teachings presented herein and below.

The components of the FIG. 1 are implemented in non-transitory and processor-readable storage medium and are executed on physical processors on one or more networks. Each processor specifically configured to execute the components.

Additionally, the FIG. 1 is presented within a specific example situation for an enterprise. It is noted that other situations can exist and benefit from the teachings presented herein.

Consider, for purposes of illustration, that an employee from ACME is hired to complete a contract assignment for enterprise (X). The contract employee is to be located on-site to X. The contract employee arrives at X and gains access to a VM from the X cloud, at 100.

The contract employee is required to login to validate his/her identity. He/she logs into an Identity Service (authentication service), at 110. Once the identity is validated, policy evaluation is processed, at 120.

Part of the policy engine determines the channel parameters that are used, at 130. The channel parameters include: which Internet Protocol (IP) address to use, which communication port to use, which keys are used for encryption and/or signing, and for how long all of these resources are to be used for. Again, policy dictates how long the channel is to be used, how long the port is to be used and how long to sign or encrypt with a particular key. This provides a mechanism where the channel is very secure and ever changing based off of the policy.

The information is returned to the Event Agent, at 140, that is running on the cloud machine. The event agent is monitoring all access and activities being performed by the contract employee. All events are monitored and then pushed to the channel designated by policy. This includes signing the event messages and encrypting them. The channel is depicted at 150.

Example events for an individual employee include, by way of example only, URL's accessed, login/logout, creating new VMs from a private cloud, installing applications, monitoring what the employee is using with the virtual machine, etc.

The channel is dynamically created with random available IP addresses on random ports using signing and encryption keys, which is only valid for a specific amount of time. There isn't a way to predict and determine which IP, ports, keys are available at which time. This allows secure messages to be communicated without any information disclosure. A hacker or malicious user will have an extremely difficult time determining how, when, and where the messages are sent. Additionally, there are all sorts of different channels that could be coming up and down for various different types of events. One system can send events to multiple channels. There can be channels all over the company and between companies.

These messages are pushed to the channel where other administrators or others with the correct rights can gain access to the messages and subscribe to the events in the channel. Subscribe Events, at 170, list an administrator who has subscribed to the same channel messages. The administrator still has to validate his/her identity and pass policy authorization to gain access to these messages.

Additionally, a server can be configured to have events pulled from the server. The collector pulls events from the server or server applications and puts the events into the desired channels. The collector has to perform an automated validation of identity and pass policy authorization requirements. The server or application also sends out multiple events to multiple channels.

At 180, there can be many different channels, which can be used for all sorts of purposes. There can be channels for servers, channels for users, or any other possible channels. By having a large number of various channels, one can securely transport information events and sensitive events to all locations without having to re-use channels. So, realistically the server running, at 160, is not using the same channel that the contract employee's is using.

This can be expanded beyond just channels within an individual enterprise; for example, since this contract employee is actually an employee for ACME, ACME wants to receive events from the Event Agent. At 190, there can be a channel between X and ACME. Similar events could be forwarded to both X's contract employee channel but also sent to the ACME channel via the Internet.

Policy can also allow some events to not be sent to ACME. If events are pertinent to X and not to ACME then they are not sent to ACME.

Additionally, an event can occur and be used in a few ways. An event can come from ACME to X to the contractor's VM. For example, say there is only one software license that can be used for an application that the contractor needs to run. This license is an ACME license. There can be an event coming from ACME to X via the channel to inform the VM that a specific application can be installed because the system at ACME has been shutdown.

Figure 2:
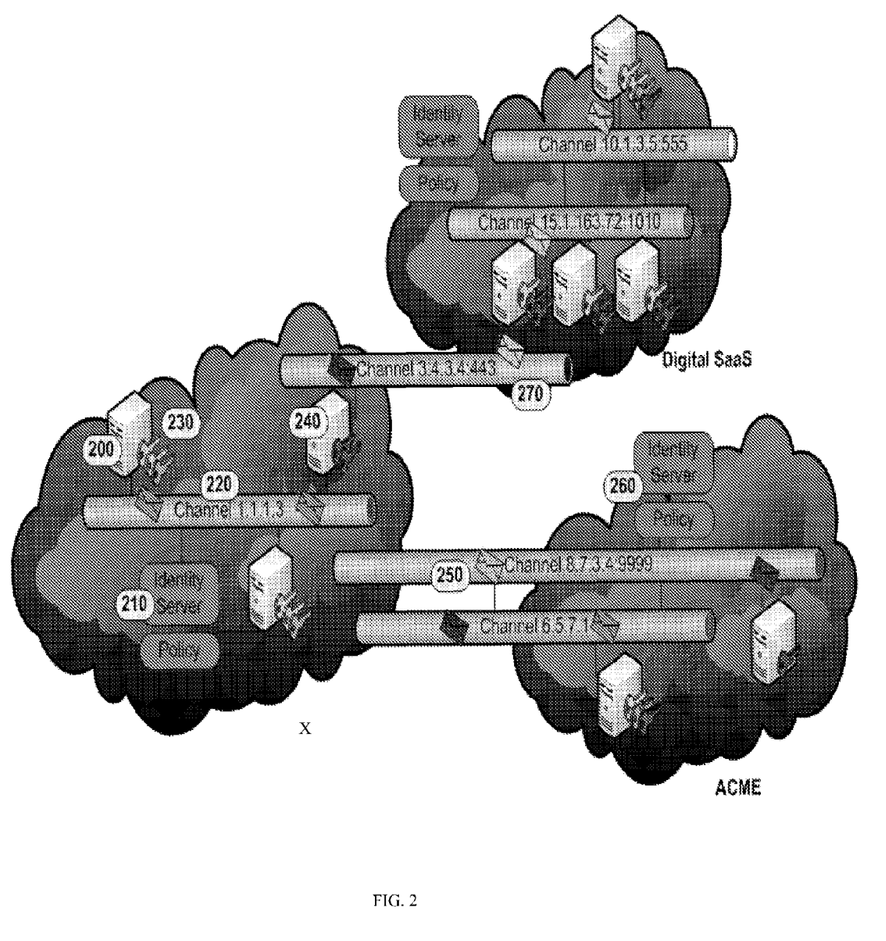
FIG. 2 is a diagram depicting a technique for complex secure channel messaging within a context of the example presented in the FIG. 1, according to the techniques presented herein.

FIG. 2 is a diagram depicting a technique for complex secure channel messaging within a context of the example presented in the FIG. 1, according to the techniques presented herein. Again, the diagram is presented for purposes of illustrating and to provide for ease of comprehension.

The FIG. 2 displays a complex listing of multiple companies using these dynamic secure channels for event and message communication. There can be multiple channels within an individual company; multiple channels coming up and down between companies; and many channels for differing reasons. The keys and the messages represent events signed and encrypted by that same grey-shaded key. Event messages can be sent to all parties who have passed the authorization and identity requirements not only within their respective enterprise but between various companies.

At 200, the contract employee is working at X. It can either authenticate to X's Identity Server, at 210, or X can have a trusted federated relationship with ACME's Identity Server, at 260. The authentication can occur over at ACME. Policy can be established both on the ACME side and on the X side.

There can be keys for both X and ACME, at 230, there can also be an X channel for events, at 220, and another channel for ACME, at 250. Channels can appear and disappear depending on the policy that was established at the time of authentication. Additionally, the channel can be notified that a new channel is being created as this one has been compromised.

There also can be channels established with other 3$^{rd}$ party companies. Take for instance Digital SaaS. This can be a SaaS provider who is hosting applications for X. There can be secure channels 270 between X and Digital SaaS. The SaaS has a SLA to provide a certain level of support; all the events from the specific servers and applications for the X tenant can be configured to use a secure channel to send events to which can be consumed by X. The processing at 240 lists a server that is storing events from Digital SaaS. It has the private key that can be used to decrypt the messages that were sent from the current channel.

Figure 3:
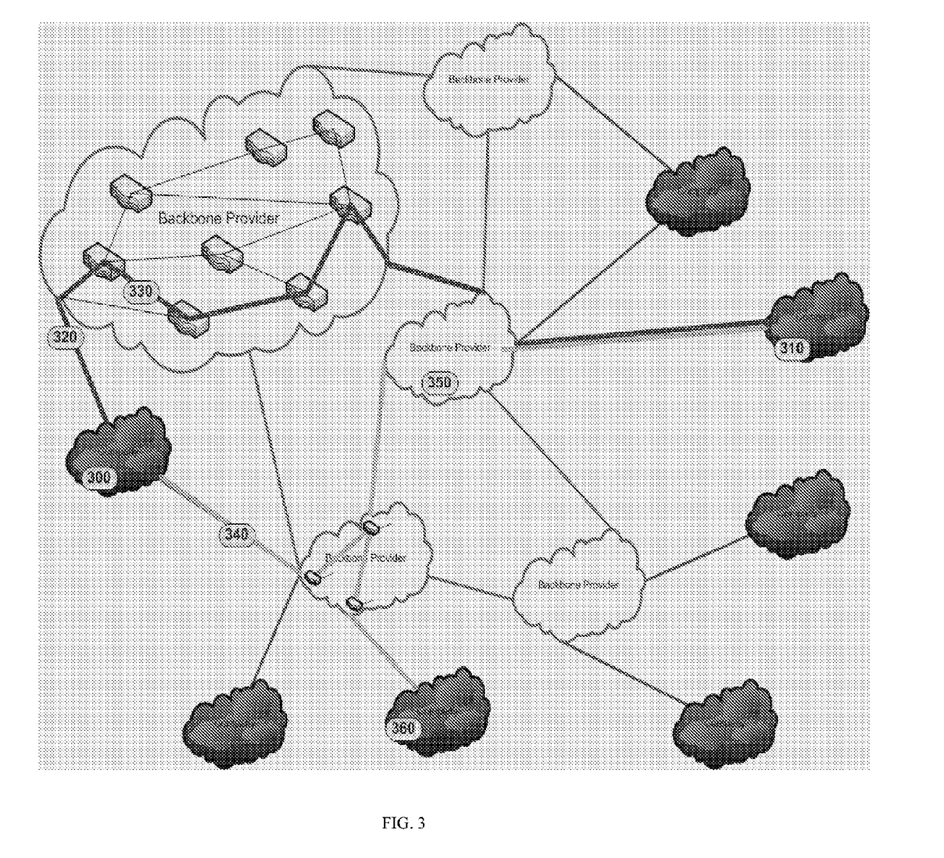
FIG. 3 is a diagram depicting a technique for secure channel messaging through the Internet, according to the techniques presented herein.

FIG. 3 is a diagram depicting a technique for secure channel messaging through the Internet, according to the techniques presented herein. Once more the FIG. 3 is presented for purposes of illustration and comprehension.

The FIG. 3 displays the Secure Channel as it is routing through the Internet. There can be multiple routing hops, multiple backbone providers, and multiple paths to send information. All of this can be using IPv4 but may soon be moving to IPv6. By moving to IPv6 there is such a large number of available IP addresses that one can easily perform the spread spectrum of dynamic channel assignment. Currently IPv4 is running out of available IP addresses. There are not a large number of IP addresses that can be used for dynamic channel assignment. Using IPv6 allows the capability to shift the channel assignment quickly, easily, without address conflicts.

Embodiments herein can be expanded to include specific routes that the events and messaging must flow through. For example, when the channel is created between the 2 companies it can also include specific routes that must be taken through the Internet or via private dedicated lines or even premium contracted lines. IPv6 allows the capability to specify a sequence of nodes to take via an IPv6 routing extension header. The Company 300 has knowledge of the possible routes and can dynamically specify which nodes the packet is to travel along the way.

In the FIG. 3, the Company 300 may need to share events with Company 310. When the channel is established between these 2 companies it chooses the route in thick-bold black shading in the FIG. 3. The events are required to move to one line of communication at 320. This can be dynamic and changed based off of time intervals established by the Identity Server and Policy.

This can also include lines of communication as listed by 330 and the thick-light shaded line in the FIG. 3. By using the IPv6 routing extension header one can specify which nodes that must be taken.

At 340, the line of communication can change after a time which was designated by policy. This time, it is required to go through a different backbone provider at 350. The IPv6 routing extension headers now list the specific sets of nodes to be taken by a new sequence in the IPv6 routing extension header.

Events could also be sent to multiple companies. At 360, the event was sent to 2 companies.

Figure 4:
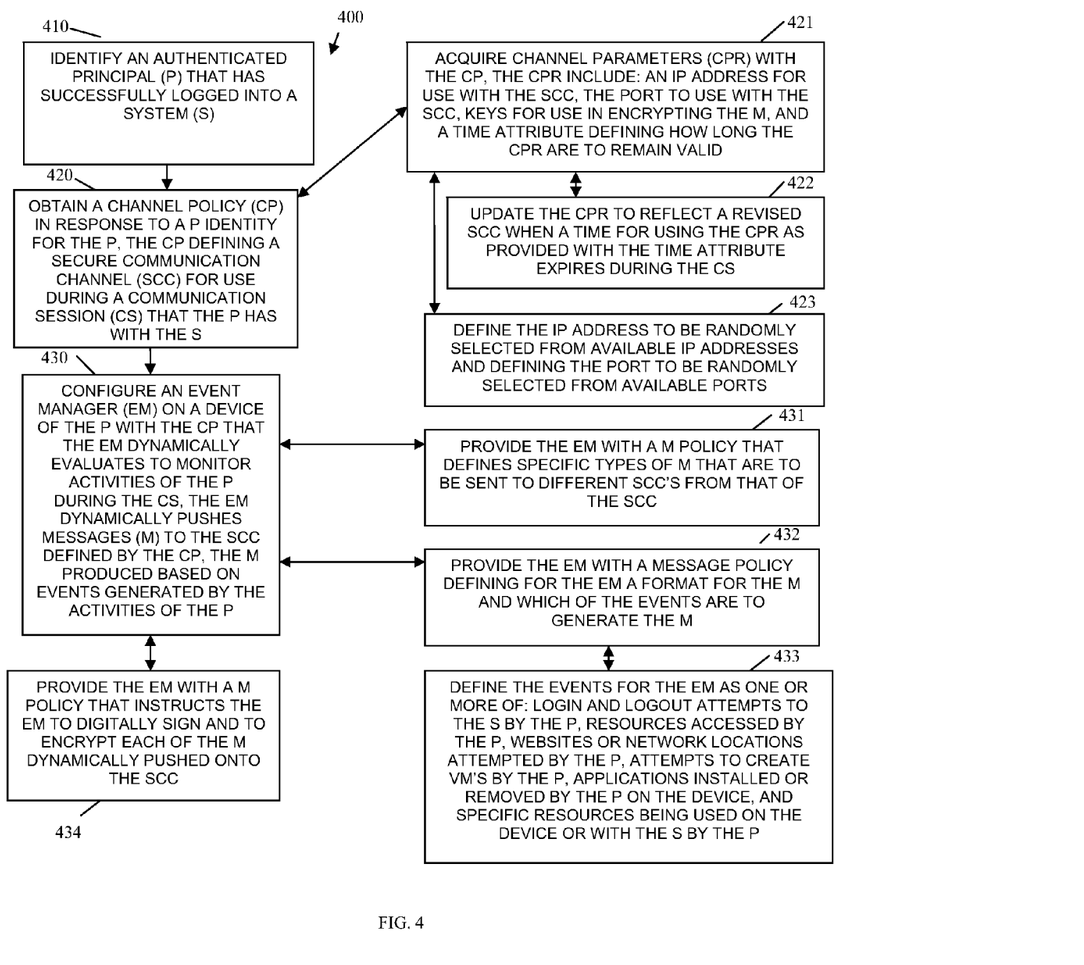
FIG. 4 is a diagram of a method for secure channel messaging, according to an example embodiment.

FIG. 4 is a diagram of a method 400 for secure channel messaging, according to an example embodiment. The method 400 (herein referred to as "secure channel manager") is implemented, programmed, and resides within a non-transitory machine-readable storage medium that executes on one or more processors of a network. The network may be wired, wireless, or a combination of wired and wireless.

As used herein above and below a "channel" refers to a logical and in some cases logical and/or physical communication connection between two resources or multiple resources. A "secure channel" is one in which security measures are taken to ensure that authorized resources are communicating and have access to the channel; this may entail authentication and/or encryption technologies. In some instances, the protocols used for communication over the channel may also be encrypted, such as via Secure Socket Layer (SSL) and other encrypted protocol technologies. It is noted that one or all available secure mechanism can be used to ensure that the channel is secure; so, secure can entail just encryption, just authentication, just a secure protocol; or, secure can entail combinations of these technologies or all of the technologies. The point is that the communication connection (channel) is made secure to ensure that just appropriate resources are receiving messages and/or communicating via the secure channel.

In an embodiment, the secure channel manager reflects a more generic depiction of the mechanism discussed above with respect to the example scenario for secure channel messaging presented with in the FIG. 1.

At 410, the secure channel manager identifies an authenticated principal that has successfully logged into a system. The system can be any Information Technology (IT) service, set of services, network, etc. In one case, the system is a particular enterprise's intranet infrastructure as presented, by way of example, above with the discussion of the FIG. 1. Any authentication mechanism can be used for authentication as determined by policy and/or the system. In one situation, the authentication mechanism is an identity service that provides an identity for the principal, which the principal uses during a communication session with the system. The principal operates from a device, such as, but not limited to, a VM.

At 420, the secure channel manager obtains a channel policy in response to a principal identity for the principal. The channel policy defines a secure communication channel for use during a communication session with the system. It is noted that the information in the channel policy can be dynamically evaluated or resolved such that it is not statically defined just based on the principal identity. In other words, the channel policy can be dependent on a variety of factors or contexts that are resolved at the time the channel policy is evaluated (discussed below).

According to an embodiment, at 421, the secure channel manager acquires channel parameters with the channel policy. The channel parameters include an IP address for use with the secure communication channel, the communication port to use with the secure communication channel, keys for use in encrypting messages, and a time attribute or criteria that defines how long the channel parameters are to remain valid for the secure communication channel. It is noted although the phrase "time attribute" suggest a defined time that this does not have to be the case. That is, the time attribute can be defined by criteria that defines a particular event that when detected indicates that the channel parameters and the secure communication channel are now invalid.

Continuing with the embodiment of 421 and at 422, the secure channel manager updates the channel parameters to reflect a revised secure communication channel when a time for using the channel parameters as defined by the time attribute expires during the communication session.

Still continuing with the embodiment of 421 and at 423, the secure channel manager defines the IP address to be randomly selected from available IP addresses and defining the port to be randomly selected from available ports. Thus, the secure communication channel can be randomly changed or constantly and randomly switching to avoid detection and to further increase the security of the secure communication channel.

At 430, the secure channel manager configures an event manager on a device (physical or VM) of the principal with the channel parameters that the event manager dynamically evaluates to monitor activities of the principal during the communication session with the system. The event manager dynamically pushes messages to the secure communication channel, defined by the channel parameters. The messaged produced based on events generated from the activities of the principal on the device and during the communication session with the VM.

In an embodiment, at 431, the secure channel manager provides the event manager with a message policy that defines specific types of messages that are to be sent to different secure communication channels from that which is associated with the secure communication channel. So, as discussed above with the FIGS. 1-3, there can be a plurality of ever changing secure communication channels and some are used for actions of the principal and some can be used to communicate selective information to other principals.

In another case, at 432, the secure channel manager provides the event manager with a message policy defining for the event manager a format for the messages and which of the events is to cause the generation of which of the messages.

Continuing with the embodiment of 432 and at 433, the secure channel manager defines the events for the event manager as one or more of: login and logout attempts to the system made by the principal, resources accessed by the principal, websites or network locations attempted to be accessed by the principal, attempts to create VMs by the principal from the device used by the principal, applications installed or removed by the principal on the device used by the principal, and/or specific resources being used on the devices or with the system by the principal.

According to an embodiment, at 434, the secure channel manager provides the event manager with a message policy that instructs the event manager to digitally sign and to encrypt each of the messages dynamically pushed onto the secure communication channel. It is noted that the encryption can be customized and specific to an intended recipient of the message. So, the encryption can be tailored based on a type of message being pushed to the secure communication channel.

Figure 5:
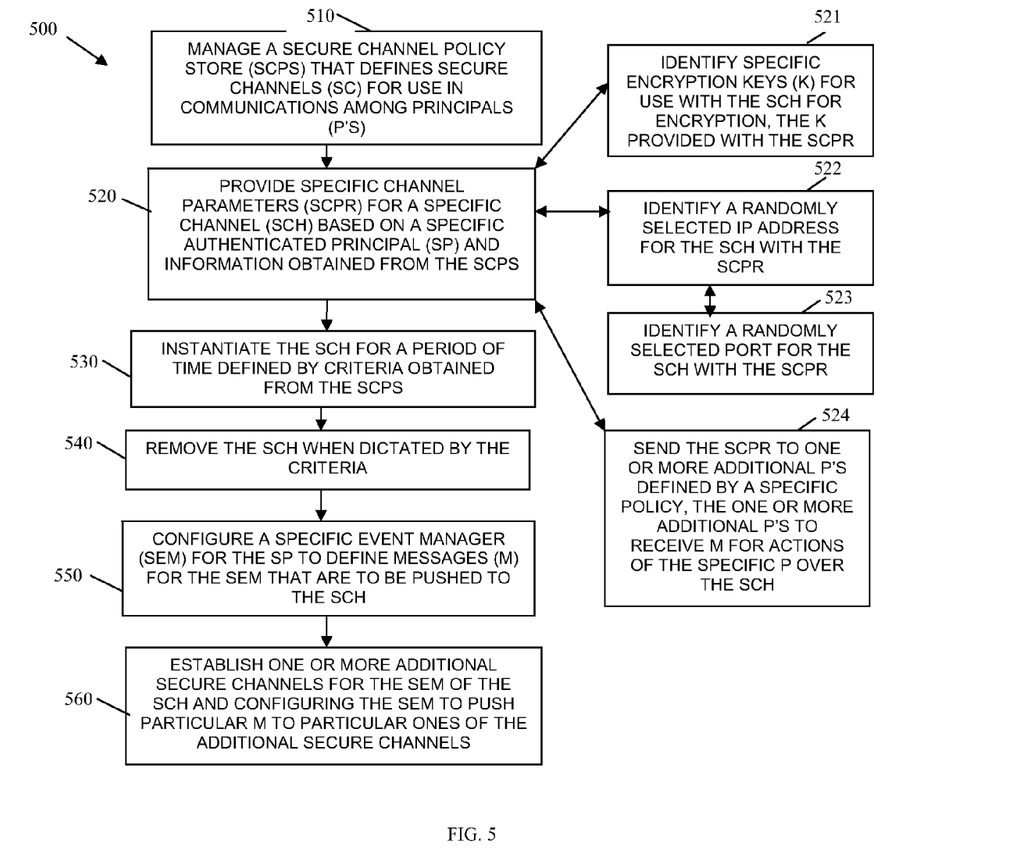
FIG. 5 is a diagram of another method for secure channel messaging, according to an example embodiment.

FIG. 5 is a diagram of another method 500 for secure channel messaging, according to an example embodiment. The method 500 (herein after referred to as "secure channel controller") is implemented, programmed, and resides within a non-transitory machine-readable storage medium that executes on one or more processors of a network. The network may be wired, wireless, or a combination of wired and wireless.

The secure channel controller is presented as another and in some cases more enhanced version of the secure channel manager presented above with respect to the FIG. 4. Additionally, in an embodiment, the secure channel controller reflects a more generic description of the processing shown with respect to the example scenario of the FIG. 2.

At 510, the secure channel controller manages a secure channel policy store that defines secure channels for use in communications among principals. Again, each channel policy includes a variety of dynamically evaluated conditions that are dynamically resolved when the channel policy is evaluated. So, although some portions of the channel policies may be statically defined, most portions are conditions that require dynamic resolution to determine a particular channel for use.

At 520, the secure channel controller provides specific channel parameters for a specific channel based on a specific authenticated principal and information dynamically obtained and evaluated from the secure channel policy store.

According to an embodiment, at 521, the secure channel controller identifies specific encryption keys for use with the specific channel and for specific encryption. The keys are provided with the specific channel parameters.

In another situation, at 522, the secure channel controller identifies a randomly selected IP address for the specific channel with the specific channel parameters.

Continuing with the embodiment of 522 and at 523, the secure channel controller identifies a randomly selected communication port for the specific channel with the specific channel parameters.

In still another scenario, at 524, the secure channel controller sends the specific channel parameters to one or more additional principals defined by a specific policy. The one or more additional parameters are to receive messages for actions of the specific principal over the secure communication channel. In other words, multiple different parties can receive information about the messages over a same channel or a different secure channel based on policy evaluation.

At 530, the secure channel controller instantiates the specific communication channel for a period of time defined by criteria obtained from the specific channel parameters. Again, the criteria can be an elapsed time and/or an event that when detected ends the period for which the specific communication channel is valid or operational.

At 540, the secure channel controller removes the specific communication channel when dictated by the criteria.

According to an embodiment, at 550, the secure channel controller configures a specific event manager for the specific principal to define messages for the specific event manager that are to be pushed onto the specific communication channel.

Continuing with the embodiment of 550 and at 560, the secure channel controller establishes one or more additional secure communication channels for the specific event manager of the specific channel. The specific event manager is configured to push particular messages to particular ones of the additional secure communication channels.

Figure 6:
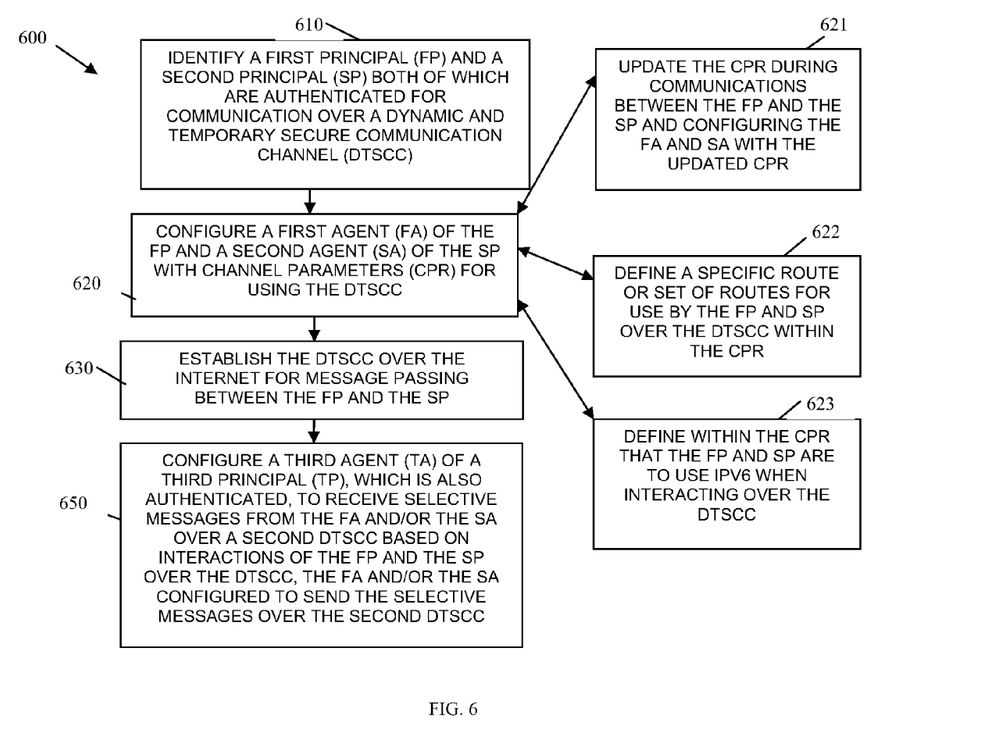
FIG. 6 is a diagram of yet another method for secure channel messaging, according to an example embodiment.

FIG. 6 is a diagram of yet another method 600 for secure channel messaging, according to an example embodiment. The method 600 (hereinafter referred to as "secure Internet channel manager") is implemented, programmed, and resides within a non-transitory machine-readable storage medium that executes on one or more processors of a network. The network may be wired, wireless, or a combination of wired and wireless.

The secure Internet channel manager provides a particular scenario of the methods 400 and 500 that is processed over the Internet. In an embodiment, the secure Internet channel manager provides a more generic perspective to the processing shown above with respect to the FIG. 3.

At 610, the secure Internet channel manager identifies a first principal and a second principal, both of which are authenticated for communication over a dynamic and temporary secure communication channel.

At 620, the secure Internet channel manager configures a first agent of the first principal and a second agent of the second principal with channel parameters for using the dynamic and temporary secure communication channel. These agents are similar to the event managers discussed above with reference to the FIGS. 1 and 4-5.

According to an embodiment, at 621, the secure Internet channel manager updates the channel parameters during communications between the first principal and the second principal and the first and second agents are configured to use the updated channel parameters.

In another case, at 622, the secure Internet channel manager defines a specific route for set of routes for use by the first principal and the second principal over the dynamic and temporary secure communication channel.

In still another situation, at 623, the secure Internet channel manager defines within the channel parameters that the first principal and the second principal are to use IPv6 when interacting over the dynamic and temporary secure communication channel.

At 630, the secure Internet channel manager establishes the dynamic and temporary secure communication channel over the Internet for secure message passing between the first principal and the second principal.

According to an embodiment, at 640, the secure Internet channel manager configures yet a third agent for a third principal, which is also authenticated, to receive selective messages from the first agent and/or the second agent over a second and different dynamic and temporary secure channel and based on interactions of the first principal and/or the second principal over the dynamic and temporary secure communication channel. The first agent and/or the second agent are configured to send the selective messages over the second dynamic and temporary secure communication channel.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
identifying an authenticated principal that has successfully logged into a system;
obtaining a channel policy in response to a principal identity for the authenticated principal, the channel policy defining a secure communication channel for use during a communication session that the principal has with the system and acquiring channel parameters with the channel policy, the channel parameters include: an Internet Protocol (IP) address for use with the secure communication channel, the communication port to use with the secure communication channel, keys for use in encrypting the messages, and a time attribute defining how long the channel parameters are to remain valid; and
configuring an event manager on a device of the principal with the channel policy that the event manager dynamically evaluates to monitor activities of the principal during the communication session, the event monitor dynamically pushes messages to the secure communication channel defined by the channel policy, the messages produced based on events generated by the activities of the principal.

2. The method of claim 1, wherein acquiring further includes updating the channel parameters to reflect a revised secure communication channel when a time for using the channel parameters as provided with the time attribute expires during the communication session.

3. The method of claim 1, wherein acquiring further includes defining the IP address to be randomly selected from available IP addresses and defining the communication port to be randomly selected from available communication ports.

4. The method of claim 1, wherein configuring further includes providing the event manager with a message policy that defines specific types of messages that are to be sent to different secure communication channels from that of the secure communication channel.

5. The method of claim 1, wherein configuring further includes providing the event manager with a message policy defining for the event manager a format for the messages and which of the events are to generate the messages.

6. The method of claim 5, wherein providing further includes defining the events for the event manager as one or more of: login and logout attempts to the system by the principal, resources accessed by the principal, websites or network locations attempted by the principal, attempts to create virtual machines by the principal, applications installed or removed by the principal on the device, and specific resources being used on the device or with the system by the principal.

7. The method of claim 1, wherein configuring further includes providing the event manager with a message policy that instructs the event manager to digitally sign and to encrypt each of the messages dynamically pushed onto the secure communication channel.

8. A method implemented in a non-transitory machine-readable storage medium and processed by one or more processors configured to perform the method, comprising:
managing a secure channel policy store that defines secure channels for use in communications among principals;
providing specific channel parameters for a specific channel based on a specific authenticated principal and information obtained from the secure channel policy store;
instantiating the specific channel for a period of time defined by criteria obtained from the secure channel policy store;
removing the specific channel when dictated by the criteria;
configuring a specific event manager for the specific principal to define messages for the specific event manager that are to be pushed to the specific channel; and
establishing one or more additional secure channels for the specific event manager of the specific channel and configuring the specific event manager to push particular messages to particular ones of the additional secure channels.

9. The method of claim 8, wherein providing further includes identifying specific encryption keys for use with the specific channel for encryption, the specific encryption keys provided with the specific channel parameters.

10. A method implemented in a non-transitory machine-readable storage medium and processed by one or more processors configured to perform the method, comprising:
managing a secure channel policy store that defines secure channels for use in communications among principals;
providing specific channel parameters for a specific channel based on a specific authenticated principal and information obtained from the secure channel policy store and identifying a randomly selected Internet Protocol (IP) address for the specific channel with the specific channel parameters and identifying randomly selected communication port for the specific channel with the specific channel parameters;

instantiating the specific channel for a period of time defined by criteria obtained from the secure channel policy store; and removing the specific channel when dictated by the criteria.

11. The method of claim 10, wherein providing further includes sending the specific channel parameters to one or more additional principals defined by a specific policy, the one or more additional principals to receive messages for actions of the specific principal over the specific channel.

12. A method implemented in a non-transitory machine-readable storage medium and processed by one or more processors configured to perform the method, comprising:

identifying a first principal and a second principal both of which are authenticated for communication over a dynamic and temporary secure communication channel;

configuring a first agent of the first principal and a second agent of the second principal with channel parameters for using the dynamic and temporary secure communication channel;

establishing the dynamic and temporary secure communication channel over the Internet for message passing between the first principal and the second principal; and configuring a third agent of a third principal, which is also authenticated, to receive selective messages from the first agent and/or the second agent over a second dynamic and temporary secure communication channel based on interactions of the first principal and the second principal over the dynamic and temporary secure communication channel, the first agent and/or the second agent configured to send the selective messages over the second dynamic and temporary secure communication channel.

13. The method of claim 12, wherein configuring further includes updating the channel parameters during communications between the first principal and the second principal and configuring the first and second agents with the updated channel parameters.

14. The method of claim 12, wherein configuring further includes defining a specific route or set of routes for use by the first principal and the second principal over the dynamic and temporary secure communication channel within the channel parameters.

15. The method of claim 12, wherein configuring further includes defining within the channel parameters that the first principal and the second principal are to use Internet Protocol version 6 (IPv6) when interacting over the dynamic and temporary secure communication channel.

* * * * *

UNITED STATES PATENT AND TRADEMARK OFFICE
CERTIFICATE OF CORRECTION

PATENT NO.        : 8,443,416 B2
APPLICATION NO.   : 13/102303
DATED             : May 14, 2013
INVENTOR(S)       : Sabin et al.

Page 1 of 1

It is certified that error appears in the above-identified patent and that said Letters Patent is hereby corrected as shown below:

In the Claims:

In column 10, line 65, in claim 10, after "identifying", insert --a--, therefor

Signed and Sealed this
First Day of October, 2013

Teresa Stanek Rea
*Deputy Director of the United States Patent and Trademark Office*